(12) United States Patent
Smith

(10) Patent No.: US 9,811,771 B2
(45) Date of Patent: Nov. 7, 2017

(54) USER TONE REPRODUCTION CURVE INK LIMIT WARNING

(71) Applicant: Xerox Corporation, Norwalk, CT (US)

(72) Inventor: Mark A. Smith, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/083,459

(22) Filed: Mar. 29, 2016

(65) Prior Publication Data

US 2017/0286816 A1  Oct. 5, 2017

(51) Int. Cl.
*G06K 15/00* (2006.01)
*H04N 1/00* (2006.01)

(52) U.S. Cl.
CPC ....... *G06K 15/407* (2013.01); *H04N 1/00015* (2013.01); *H04N 1/00068* (2013.01); *H04N 1/00076* (2013.01); *H04N 1/00082* (2013.01); *H04N 2201/0094* (2013.01)

(58) Field of Classification Search
USPC ........................................................ 358/1.15
See application file for complete search history.

(56) References Cited

U.S. PATENT DOCUMENTS

| 5,635,967 | A | 6/1997 | Klassen |
| 5,649,071 | A | 7/1997 | Klassen et al. |
| 5,825,986 | A | 10/1998 | Ferguson |
| 6,161,919 | A | 12/2000 | Klassen |
| 6,224,189 | B1 | 5/2001 | Kletter |
| 6,275,302 | B1 | 8/2001 | Coleman |
| 6,704,123 | B1 | 3/2004 | Av-Shalom et al. |
| 7,440,139 | B2 | 10/2008 | Loce et al. |
| 8,995,021 | B2 | 3/2015 | Li et al. |
| 2002/0083852 | A1* | 7/2002 | Degani ............... H04N 1/6097 101/171 |
| 2004/0136015 | A1* | 7/2004 | Van de Capelle ... H04N 1/6033 358/1.9 |
| 2008/0296195 | A1* | 12/2008 | Suarez ............... B65D 88/1618 206/524.1 |
| 2009/0009766 | A1* | 1/2009 | Bonino ..................... G01J 3/02 356/402 |
| 2009/0086290 | A1 | 4/2009 | Ming et al. |
| 2009/0296175 | A1* | 12/2009 | Conrow ............... H04N 1/6033 358/534 |
| 2010/0150582 | A1* | 6/2010 | Klassen ............... G03G 15/553 399/27 |
| 2010/0216374 | A1* | 8/2010 | Offer ..................... B24D 13/10 451/28 |
| 2012/0206745 | A1* | 8/2012 | Shibuya ............... H04N 1/6097 358/1.9 |

* cited by examiner

*Primary Examiner* — Ngon Nguyen
(74) *Attorney, Agent, or Firm* — Gibb & Riley, LLC

(57) ABSTRACT

If elements (curves) of a tone reproduction curve increase application of marking material, the magnitudes of the elements of the tone reproduction curve are summed. If the summed magnitudes of the elements of the tone reproduction curve exceed marking material limits, a warning message is output.

16 Claims, 7 Drawing Sheets

| DROP SIZE | MEDIA | RECOMMENDATION |
|---|---|---|
| SMALL | UNTREATED | ✓ |
| MEDIUM | UNTREATED | ✓ |
| LARGE | UNTREATED | ✗ |
| MAX | UNTREATED | ✗ |
| SMALL | TREATED | ✓ |
| MEDIUM | TREATED | ✗ |
| LARGE | TREATED | ✗ |
| MAX | TREATED | ✗ |

FIG. 3

USER TONE REPRODUCTION CURVE INK LIMIT WARNING

BACKGROUND

Systems and methods herein generally relate to processing digital items into print-ready forms and printing such items, and more particularly to the use of tone reproduction curves to alter bitmaps.

Printing devices, such as aqueous inkjet printers are subject to contamination from excessive marking material (e.g., ink, toner, etc.) applied to a sheet surface. The exact amount of ink that may be applied without causing contamination is related to the type of ink, size of drops used, and the characteristics of the sheet surface. For example, untreated media can tolerate a greater application of ink, as the ink soaks into the paper fibers; and hence is less likely to transfer to internal parts of the printer and cause contamination. Even so, there is an upper limit beyond which ink on untreated media will cause contamination.

SUMMARY

With methods herein, if elements (curves) of a tone reproduction curve increase application of marking material (e.g., ink, etc.), the magnitudes of the curves of the tone reproduction curve are summed. If the summed magnitudes of the curves of the tone reproduction curve exceed marking material limits, a warning message is output.

Such methods determine if elements (e.g., individual curves) of the tone reproduction curve increase application of the marking material. If the curves of the tone reproduction curve increase application of the marking material, these methods sum the magnitudes of the curves of the tone reproduction curve (in potentially different ways) and determine if the summed magnitudes of the curves of the tone reproduction curve exceed the marking material limits. Thus, these methods output a warning message if the summed magnitudes exceed the marking material limits.

The marking material limits can be empirical ink limits (e.g., machine-dependent marking material limits) and/or profile ink limits (e.g., user-established marking material limits). For purposes herein "profile ink limit" means the maximum ink that the profile is constructed to output given any input value, expressed as a percentage of all process colorants output by that profile. An exemplary profile as such is defined according to standards promulgated by the International Color Consortium. If the machine-dependent marking material limit is greater than the user-established marking material limit, the aforementioned process of summing the magnitudes of the curves of the tone reproduction curve is performed as follows. For each of the curves of the tone reproduction curve, the maximum magnitude by which each individual curve increases application of the marking material is identified, and such maximum magnitudes are summed to produce a magnitude sum. In this situation, the process of determining if the summed magnitudes of the curves of the tone reproduction curve exceed the marking material limits is performed by identifying the difference between the machine-dependent marking material limit and the user-established marking material limit to produce a limit difference, and determining if the magnitude sum exceeds the limit difference.

In another situation, if the machine-dependent marking material limit and the user-established marking material limit are equal, the process of summing the magnitudes of the curves of the tone reproduction curve is performed as follows. To sum the magnitudes of the curves of the tone reproduction curve, this processing sums output values for each input value outside of the safe area of all of the curves of the tone reproduction curve to produce a summed output value for each input value outside of the safe area. In this situation, to determine if the summed magnitudes of the curves of the tone reproduction curve exceed the marking material limits, this processing determines if the summed output value for each input value outside of the safe area exceeds the machine-dependent marking material limit.

Regarding a "safe area," an identity line in a tone reproduction curve represents the situation where input equals output (e.g., where the user TRC does not alter the input). Any curve or portion of a curve that is "below" the identity line is in the "safe area" because being below the identity line means that the curve (or portion of the curve) reduces the output relative to the input. When a curve (or portion of a curve) is below the identity line, the methods and systems herein do not output a warning because marking material output is being decreased (relative to the input) and such would not result in a situation where excessive ink is applied to the print media. To the contrary, any curve or portion of a curve that is "above" the identity line may cause an excessive ink situation because curves (or portions of curves) that are above the identity line increase the output relative to the input. Therefore, the methods and devices herein only evaluate situations where the curve (or portion of a curve) is above the identity line (e.g., where output increases relative to input).

The warning can be altered based on a policy to disallow or allow creation or import of over-limit tone reproduction curves, disallow or allow assignment of over-limit tone reproduction curves to specific jobs or queues, allow over-limit tone reproduction curve sheets to print, display a menu option to an operator regarding whether an over-limit sheet should print, and/or identify over-limit tone reproduction curve jobs as being faulty, etc. For purposes herein "queue" means a mechanism for automatically identifying the print media type, mark (i.e. drop) size, profile and other properties to be used when processing the job; but not explicitly specified by the job itself. Also, the warning can be output at the time a user tone reproduction curve is created, at the time a user tone reproduction curve is assigned to a job, a queue, or an exception page, or at the time a job or sheet begins printing, etc.

Exemplary printing apparatuses herein include a DFE with a processor. A usual workflow is to create TRCs at the DFE using DFE GUI features. A secondary workflow is to import a TRC from media or the network. A print job can identify the tone reproduction curve, print data, print media type, mark (e.g., drop) size, etc.

If the curves of the tone reproduction curve increase application of the marking material, a processor sums magnitudes of the curves of the tone reproduction curve, and determines if the summed magnitudes of the curves of the tone reproduction curve exceed the marking material limits, and a graphic user interface outputs a warning message if the summed magnitudes exceed the marking material limits.

As noted above, the marking material limits can be machine-dependent marking material limits or user-established marking material limits. If the machine-dependent marking material limit is greater than the user-established marking material limit, a processor sums magnitudes of the curves of the tone reproduction curve in the following processing. For each of the curves of the tone reproduction curve, a processor identifies a maximum magnitude by which the curve increases application of the marking material, and sums such maximum magnitudes to produce a magnitude sum. A processor also determines if the summed magnitudes of the curves of the tone reproduction curve exceed the marking material limits by identifying the difference between the machine-dependent marking material limit and the user-established marking material limit to produce a limit difference, and determining if the magnitude sum exceeds the limit difference.

In another situation, if the machine-dependent marking material limit and the user-established marking material limit are equal, the following processing is performed. A processor sums the magnitudes of the curves of the tone reproduction curve by summing output values for each input value outside of the safe area of all of the curves of the tone reproduction curve to produce a summed output value for each input value outside of the safe area. A processor then determines if the summed magnitudes of the curves of the tone reproduction curve exceed the marking material limits by determining if the summed output value for each input value outside of the safe area exceeds the machine-dependent marking material limit.

The warning can be altered based on a policy to disallow or allow creation or import of over-limit tone reproduction curves, disallow or allow assignment of over-limit tone reproduction curves to specific jobs or queues, allow over-limit tone reproduction curve sheets to print, display a menu option to an operator regarding whether an over-limit sheet should print, and/or identify over-limit tone reproduction curve jobs as being faulty, etc. Also, the warning can be output at the time a user tone reproduction curve is created, at the time a user tone reproduction curve is assigned to a job, a queue, or an exception page, or at the time a job or sheet begins printing, etc.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 3 is a schematic diagram illustrating warnings produced by methods and devices herein;

DETAILED DESCRIPTION

Figure 1:
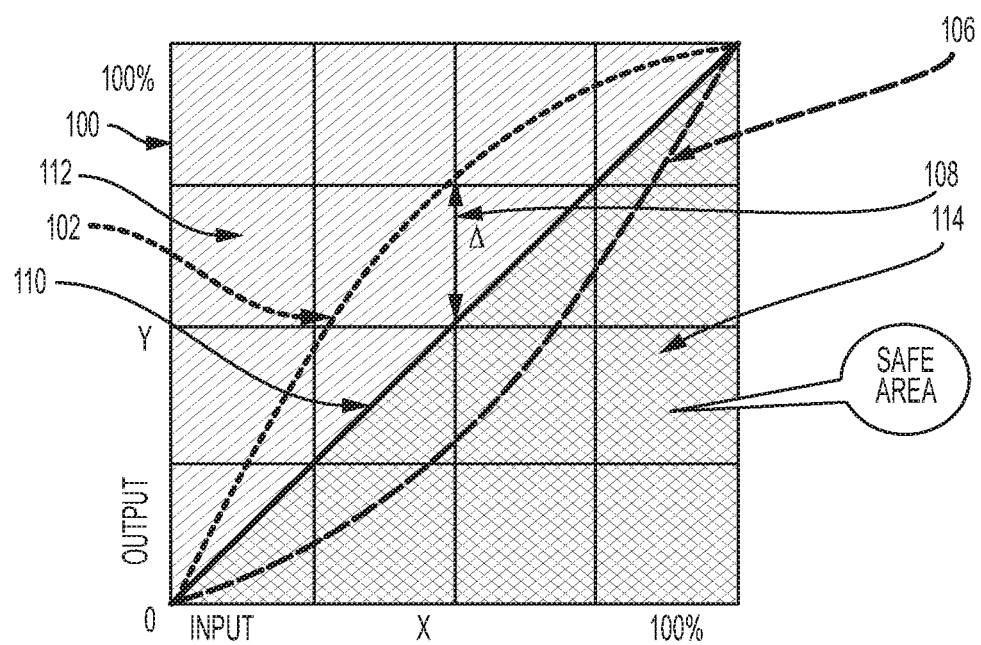
FIG. 1 is a schematic diagram illustrating processing performed by methods and devices herein.

As mentioned above, aqueous inkjet printers are subject to contamination from excessive ink applied to a sheet surface. While a digital front end (DFE) may apply an ink limited profile to job images to ensure that all pixel values are within the limits defined for the drop size and print media type selected, later in the printer's video path, a user TRC (tone reproduction curve) may be applied to the job images that allows arbitrary changes to be made to pixel values in each of the CMYK (cyan, magenta, yellow, black) separations. Such job images having changed pixel values may thereafter exceed the limits defined for the drop size and print media type selected.

The architectural responsibility for processing a user TRC is assigned to the printing device video path for several reasons. One reason is cost. It is less expensive to implement the TRC function in the printer's existing video hardware than it is to perform the equivalent function in DFE software ahead of the ink limiting algorithm. This is because the TRC algorithm has substantial incremental computational power to execute at print rates.

Another reason for processing the user TRC using the printer's video path relates to reprinting operations. An adjusted user TRC can be applied to alter pixels in saved print-ready images that are being reprinted; and the adjusted user TRC is applied in the printer's video path, not in the DFE, which prevents the images altered by the adjusted user TRC from being checked against the ink limited profile (potentially allowing pixel values that exceed the limits defined for the drop size and print media type to be printed).

An additional reason for applying the user TRC using the printer's video path relates to real time adjustment made by the operator while printing. An adjusted user TRC can be applied to a printing job in real time to suit the preferences of the operator. This is not possible if the TRC were to be included in the print ready images at the time the job is raster image processed by the DFE, which would be considerably in advance of printing.

For printer image path architectures (where each different color or separation is independently processed by different pieces of hardware), a final ink limiting function is problematic to implement because the independent decisions by each piece of hardware are made without knowledge of the other decisions being made, which would lead to objectionable image quality (IQ) outcomes.

In view of such issues, methods and devices herein output a warning in situations where application of a user TRC could exceed the printer ink limit based on analysis of the TRC and queue properties. Such a warning is a caution that the ink limit could be exceeded; not necessarily that it will be exceeded. This warning indicates to the operator that the operator should check the printed output for image quality defects (e.g. because ink or other marking material may have rubbed off on to printer parts), and check the printer for contamination.

The warning may be issued at several different points in the standard printing workflow, depending on product requirements. Thus, the warning can be issued: at the time the user TRC is created; at the time the user TRC is assigned to the job, the queue, or the exception page; at the time the job or sheet begins printing; etc. Additionally, each of the warnings can be conditioned by a site policy set by the system administrator that can, for example, disallow or allow creation or import of over-limit TRCs, disallow or allow assignment of over-limit TRCs to jobs or queues (e.g., a given TRC may be over-limit when specified for one queue, but not over-limit when specified for some other queue with a different drop size, media, and profile selected), allow over-limit TRC sheets to print, ask the operator if the over-limit sheet should print, identify over-limit TRC jobs as being faulty, etc. Thus, for example, TRCs can be specified as page exceptions, so the job may start to print before an issue with an over-limit TRC is encountered. In other words, the devices and methods herein determine when a TRC over-limit warning should be issued based on analysis of the TRC and queue properties; and, therefore, actual print ready image content does not need to be consulted as part of the processing.

In greater detail, FIG. 1 illustrates a graph showing a user-created TRC 100 that includes curves for cyan 102 and magenta 106. The devices and methods herein determine whether or not the curves in the user TRC 100 have any points above the "identity TRC" line 110, which is a straight line between 0% input/output and 100% input/output. In this example, the black and yellow curve lie on the identify line 110 (e.g., are the same as the identify line 110) and are therefore not visible in FIG. 1.

The identity line 110 represents the situation where input equals output (e.g., where the user TRC does not alter the input). Any curve or portion of a curve that is "below" the identity line 110 is in the "safe area" 114 because being below the identity line 110 means that the curve (or portion of the curve) reduces the output relative to the input. When a curve (or portion of a curve) is below the identity line 110, the methods and systems herein do not output a warning because marking material output is being decreased (relative to the input) and such would not result in a situation where excessive ink is applied to the print media. To the contrary, any curve or portion of a curve that is "above" the identity line 110 may cause an excessive ink situation because curves (or portions of curves) that are above the identity line 110 increase the output relative to the input. Therefore, the methods and devices herein only evaluate situations where the curve (or portion of a curve) is above the identity line 110 (e.g., where output increases relative to input).

Therefore, if a specific pixel were to receive an input to mark at 40% for a given color, the output would not be changed by the corresponding curve within the user TRC that lies on the identity line 110, meaning that the output would be 40% for that 40% input. Again, this is because curves or portions of curves in the user TRC that are on the identity line 110 do not alter the input, but instead make the input the same as the output. As explained above, if a curve or portion of a curve in the user TRC is below the identity line 110, this means that the curve reduces the output value relative to the input value. Therefore, a curve that is below the identity line 110 may reduce an input of 40% to an output of 30%. To the contrary, if a curve (or portion of a curve) is above the identity line of 110, the curve increases the output relative to the input, which may increase the input of 40% to an output of 50%, which has the possibility of creating an excessive ink situation, and methods and systems herein further evaluate such situations to determine if a warning should be issued.

In FIG. 1, the yellow, black, and magenta 106 curves are all either on the identity line 110 or in the safe area 114 below the identity line 110. However, the cyan curve 102 is above the identity line 110, and lies partially in the output-increasing area 112, and may be a potential problem. For purposes herein, a TRC with all curves in the safe area 114 below the identity line 110, can be used with any media or drop size without causing ink limit issues.

Therefore, these methods and devices determine if the TRC 100 has any potentially excessive curves that have points above the "identity TRC" line 110. In FIG. 1, curve 102 is a potentially excessive curve because it exceeds the identity TRC line 110. When potentially excessive curves are present, the methods and devices herein determine whether the magnitude of the potentially excessive curve is greater than the difference between a machine-dependent marking material limit and a user-established marking material limit (and if the magnitude is greater than the difference between the limits, issue a warning).

More specifically, an empirically created table maps the combination of media and drop size into a maximum ink limit (referred to herein as the "machine-dependent marking material limit"). The machine-dependent marking material limit will generally be identical on all printing devices of the same model number.

Manufacturers provide one or more factory installed destination profiles for the DFE. The user then selects one of these to be assigned to the job and/or queue. A property of each destination profile is its inherent ink limit. So, the user does not necessarily directly or intentionally specify an ink limit. The ink limit is an outcome of selecting a profile. Also, some DFEs allow 3rd party-built (i.e. not by the printer manufacturer) destination profiles to be imported. The user specifies an ink limit as part of the import process. The user-established marking material limit is generally equal to or below the machine-dependent marking material limit, and if it is not, the DFE identifies that situation as an error before the print job reaches the printer's video path. However, job images altered by user TRCs may have changed pixel values that exceed the limits defined for printer.

As noted above, if the magnitude of the potentially excessive curve is greater than the difference between the machine-dependent marking material limit and the user-established marking material limit, the methods and devices herein issue a warning. More specifically, the magnitude of all potentially excessive curves are added together, and the maximum magnitude (e.g., 108) by which each individual color curve exceeds the identity line 110 is the amount that is used for a given curve's magnitude. This allows the methods and devices herein to determine if the sum of the maximum magnitudes of all potentially excessive curves exceeds the difference between the machine-dependent marking material limit and the user-established marking material limit, when determining whether to issue a warning.

In a numerical example, for a given print job, the DFE may determine from the empirical table that the machine-dependent marking material limit is 385% (out of a possible 400%). Here, the values are in percentages (e.g., where each of the four colors may be printed at 100%, resulting in 400% total).

The printing device may have a user-established marking material limit of 270% for the media and drop size combination of the print job. The difference between the machine-dependent marking material limit and the user-established marking material limit is 115% (385%−270%=115%). In FIG. 1, the cyan curve 102 deviates from the identity line 110 by a maximum magnitude of 27% at an input value of 50% (as shown by delta line 108 in FIG. 1). In this example, the sum of the maximum magnitudes of all potentially excessive curves is 27%, and 27% does not exceed the difference between the machine-dependent marking material limit and the user-established marking material limit of 115%, preventing the methods and systems herein from issuing a warning.

Alternatively, if the cyan curve 102 deviates from the identity line 110 by a maximum magnitude greater than the limit difference (e.g., if the limit difference were only 15%), or if the yellow curve matched the cyan curve 102, and their combined maximum magnitudes were 127%, the sum or individual maximum magnitude of 127% would exceed the limit difference of 115%, and the methods and systems herein would issuing a warning. Again, the warning can be presented on the user interface of the device controlling printing and can disallow creation or assignment of over-limit TRCs to jobs or queues, ask the operator if the over-limit sheet should print, identify over-limit TRC jobs as being faulty. In some cases, the machine-dependent marking material limit and the user-established marking material limit are equal to one another, making the difference between such limits zero.

In such cases, the methods and devices herein sum the TRC output values of every input value outside of the safe area (instead of summing the maximum magnitudes of all potentially excessive curves) and, for each input value outside of the safe area, compare the summed output values with the machine-dependent marking material limit. Thus, for every input value outside of the safe area, the methods and devices herein sum the output values of each of the individual TRC curves and compare the summed output values with the machine-dependent marking material limit. This situation is shown using FIG. 2 as an example.

Figure 2:
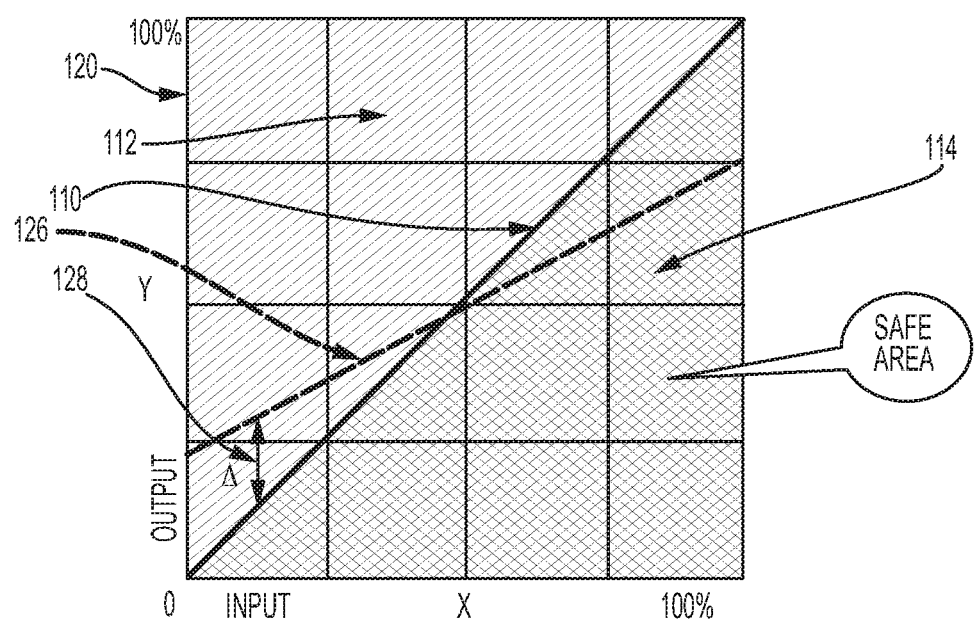
FIG. 2 is a schematic diagram illustrating processing performed by methods and devices herein.

More specifically, FIG. 2 illustrates a user-created TRC 120 that has the yellow, cyan, and black lying along the identify line 110 (or such curves lie within the safe area 114) and, therefore, such lines are not shown in FIG. 2. However, the magenta curve 126 lies partially in the potentially output-increasing area 112, and may present a problem, so additional processing is performed by methods and devices herein to determine if a warning should be issued for the potentially excessive curve.

In the example in FIG. 2, the print job defines printing with 'max' sized drops on untreated paper. The DFE uses the empirical table to yield a result of machine-dependent marking material limit=137% (out of a possible 400%). The profile used for this media and drop size combination was built with a user-established marking material limit of 137%. This leaves zero difference between the limits 137%-137%=0.

At an input value of 12%, if yellow, cyan, and black lie along the identity line 110, they will have an output value of 12%. However, as shown in FIG. 2, the magenta curve 126 lies above the identity line 110 and the magnitude 128 of this excessive curve would be an output of 27% at an input of 12%.

As described above, when the machine-dependent marking material limit and the user-established marking material limit are equal, the methods and devices herein sum the output values of each of the individual TRC curves and compare the summed output values with the machine-dependent marking material limit. In the example shown in FIG. 2, with a given input of 12%; cyan (c), yellow (y), and black (b) are 12%, and magenta (m) is 27%. So the summation at this input value is: 12% (c)+12% (y)+12% (k)+27% (m)=63%. The summation of 63% is well within the equal limits of 137%. The methods and devices repeat the same calculation for each input value outside of the safe area to see if the remainder TRC curves falls within the limit of 137%. If they do, no warning is output, if any input exceeds the limit, a warning is output (as detailed above). In some situations, a combination of these approaches can be used to take into consideration both the output value and the delta from identity at every input value to ensure that the user TRC will not cause the ink limit to be exceeded in any circumstance.

Also, if it is not known what job or queue a TRC will ultimately be associated with (and, therefore, the media, drop size and profile are unspecified), the methods and systems herein present a display of what combinations of drop size and media might be reasonable to specify along with the proposed TRC. This is shown, for example, in FIG. 3 where the display 140 shows different drop sizes 142, different media types 144, and a recommendation 146 as to whether the combination of drop size and media type would not cause excessive ink accumulations with the proposed TRC. Similarly, the methods and devices herein present pull-down options that let the operator select one of the various resident profiles to see how well it works with the TRC curves being created. Once the destination profile has been selected, the DFE can execute the ink limit warning process described above, which can change which combinations are recommended.

Figure 4:
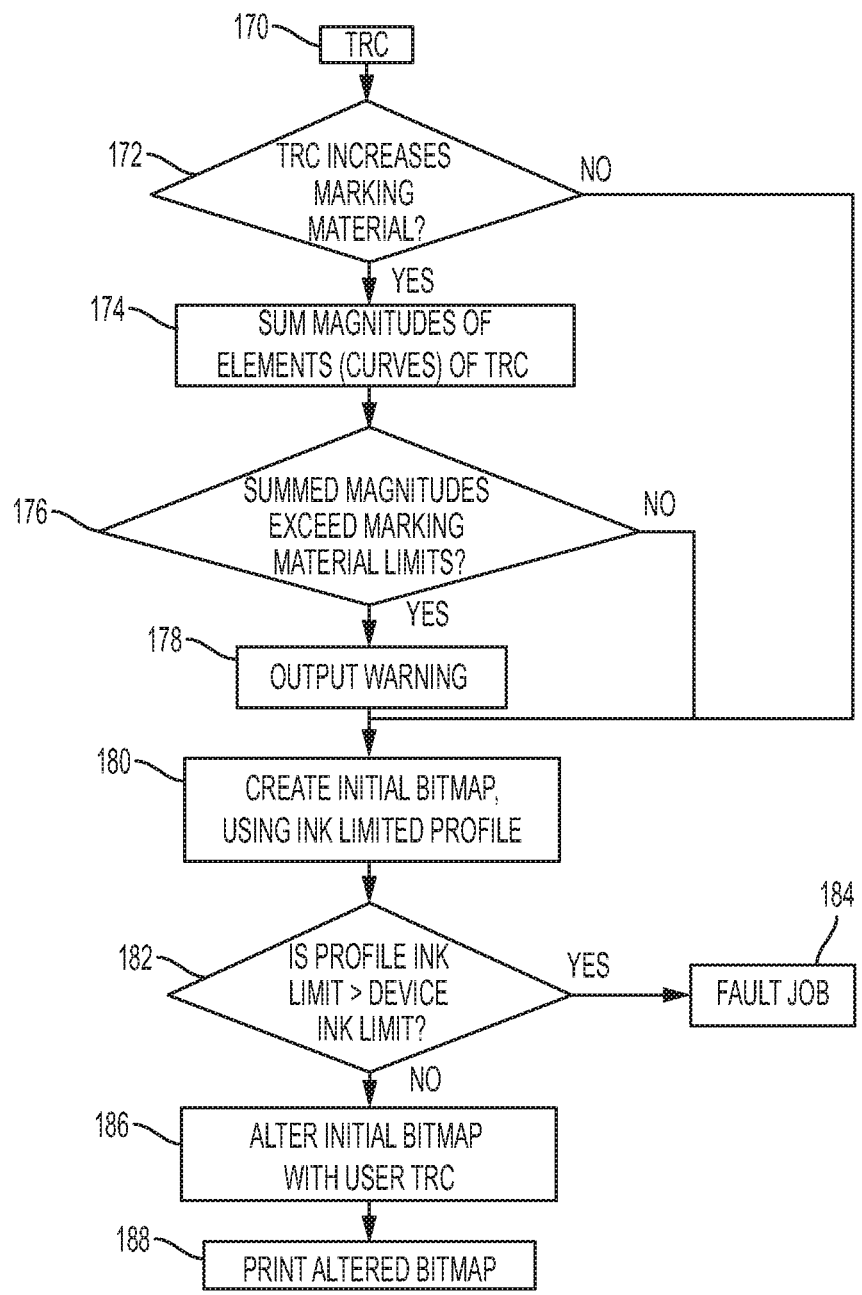
FIG. 4 is a flowchart illustrating processing performed by methods and devices herein.

FIG. 4 is flowchart illustrating exemplary methods herein. Item 170 shows a TRC. In item 172, such methods automatically determine if elements (e.g., individual curves) of the tone reproduction curve increase application of the marking material by evaluating whether the tone reproduction curve increases the percentage application of the different marketing materials (e.g., whether one of the curves (or a portion of one of the curves) is above the identity line 110). If curves of the tone reproduction curve do not increase application of the marking material, processing proceeds directly to item 180 where an initial bitmap is automatically created.

If the elements of the tone reproduction curve increase application of the marking material, in item 174 these methods automatically sum the magnitudes of the elements of the tone reproduction curve. In item 176, such methods automatically determine if the summed magnitudes of the elements of the tone reproduction curve exceed the marking material limits.

More specifically, if the machine-dependent marking material limit is greater than the user-established marking material limit, the process of summing the magnitudes of the elements of the tone reproduction curve in item 174 is performed as follows. For each of the elements of the tone reproduction curve, the processing identifies the maximum magnitude by which each individual curve increases application of the marking material, and sums such maximum magnitudes to produce a magnitude sum. In this situation then, the process of determining if the summed magnitudes of the elements of the tone reproduction curve exceed the marking material limits in item 176 is performed by identifying the difference between the machine-dependent marking material limit and the user-established marking material limit to produce a limit difference, and determining if the magnitude sum exceeds the limit difference.

In another situation, if the machine-dependent marking material limit and the user-established marking material limit are equal, the process of summing the magnitudes of the elements of the tone reproduction curve in item 174 is performed as follows. To sum the magnitudes of the elements of the tone reproduction curve (item 174), this processing sums output values for each input value outside of the safe area of all of the elements of the tone reproduction curve to produce a summed output value for each input value outside of the safe area. In this situation, to determine if the summed magnitudes of the elements of the tone reproduction curve exceed the marking material limits in item 176, this processing determines if the summed output value for each input value outside of the safe area exceeds the machine-dependent marking material limit.

If the summed magnitudes of the elements of the tone reproduction curve do not exceed the marking material limits in item 176, processing proceeds directly to item 180 where the initial bitmap is created. To the contrary, these methods automatically output, from the interface, a warning message in item 178 if the summed magnitudes exceed the marking material limits. The warning output in item 178 can be altered based on a policy to disallow or allow creation or import of over-limit tone reproduction curves, disallow or allow assignment of over-limit tone reproduction curves to specific jobs or queues, allow over-limit tone reproduction curve sheets to print, display a menu option to an operator regarding whether an over-limit sheet should print, and/or identify over-limit tone reproduction curve jobs as being faulty, etc. Also, the warning can be output at the time a user tone reproduction curve is created, at the time a user tone reproduction curve is assigned to a job, a queue, or an exception page, or at the time a job or sheet begins printing, etc.

Because item 178 only outputs a warning, printing can proceed and processing can flow from item 178 to item 180, where the methods automatically create an initial bitmap using the ink limited profile. In item 182, such methods determine if the initial bitmap is within marking material limits for the print media type and the mark size by determining whether the profile ink limit is greater than the device ink limit and, if it is, the job is faulted and processing stops in item 184 (where the methods automatically output an error message if the initial bitmap is not within the marking material limits). In item 186, these methods alter the initial bitmap using the tone reproduction curve to produce an altered bitmap. In item 188, such methods print the altered bitmap on print media using printing elements of the printing apparatus.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by a machine (especially when the pixel data being processed, and the speed at which such data is evaluated so as to be supplied to printing elements is considered). For example, if one were to manually attempt to control the printing elements on a pixel-by-pixel basis, the manual process would be sufficiently inaccurate and take an excessive amount of time so as to render the manual process useless. Specifically, processes such as receiving electronic data streams, creating bitmaps, altering bitmaps with TRCs, controlling printing equipment on a pixel-by-pixel basis, etc., requires the utilization of different specialized machines, and humans performing such processing would not produce useful results because of the time lag, inconsistency, and inaccuracy humans would introduce into the results. Further, such machine-only processes are not mere "post-solution activity" because the conversion of documents into print ready images and the process of controlling printing equipment on a pixel-by-pixel basis are central to claims. In other words, these various machines are integral with the methods herein because the bitmap creation and manipulation, the control of the printing elements, etc., cannot be performed without the machines (and cannot be performed by humans alone).

Figure 5:
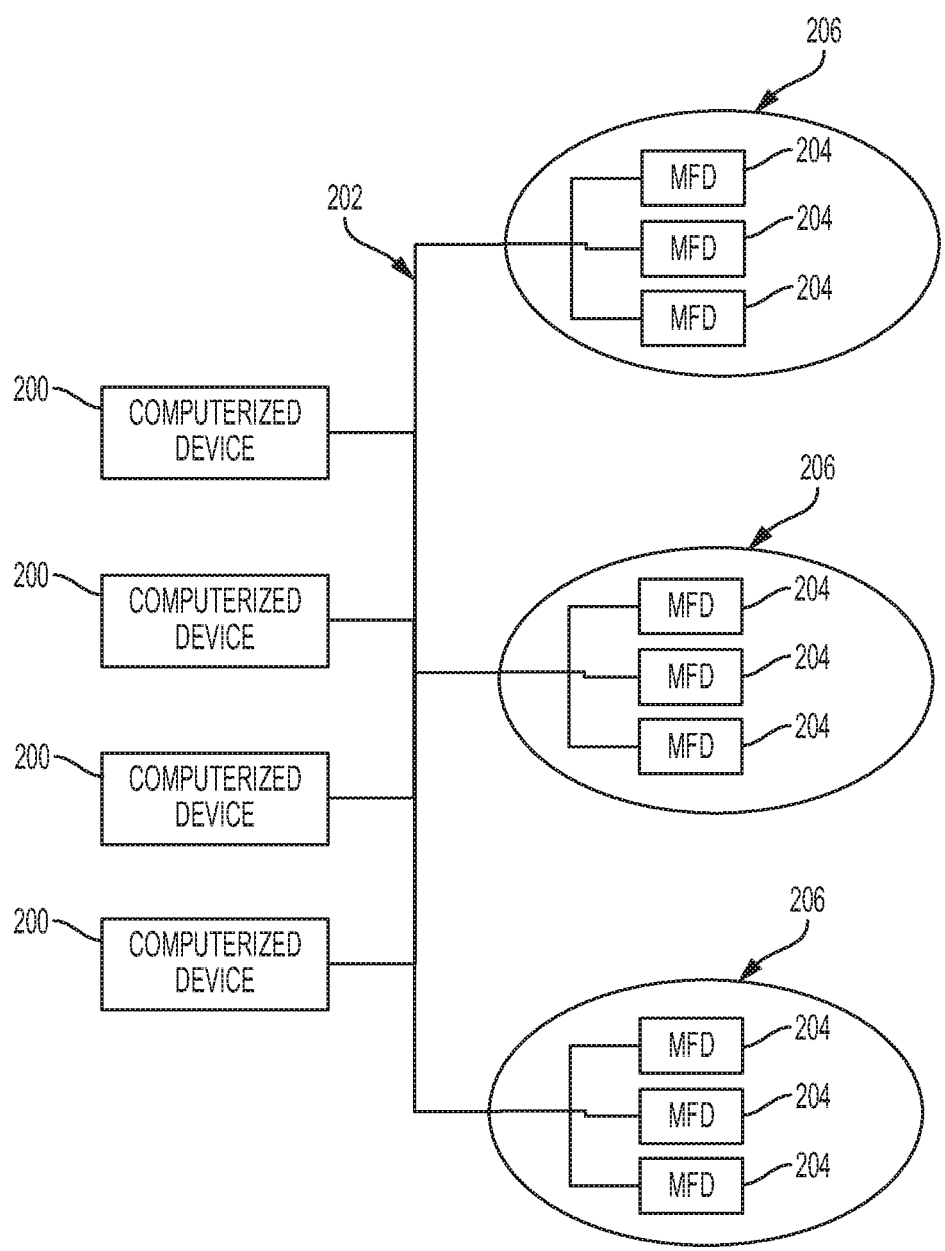
FIG. 5 is a schematic diagram illustrating systems herein.

As shown in FIG. 5, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 6:
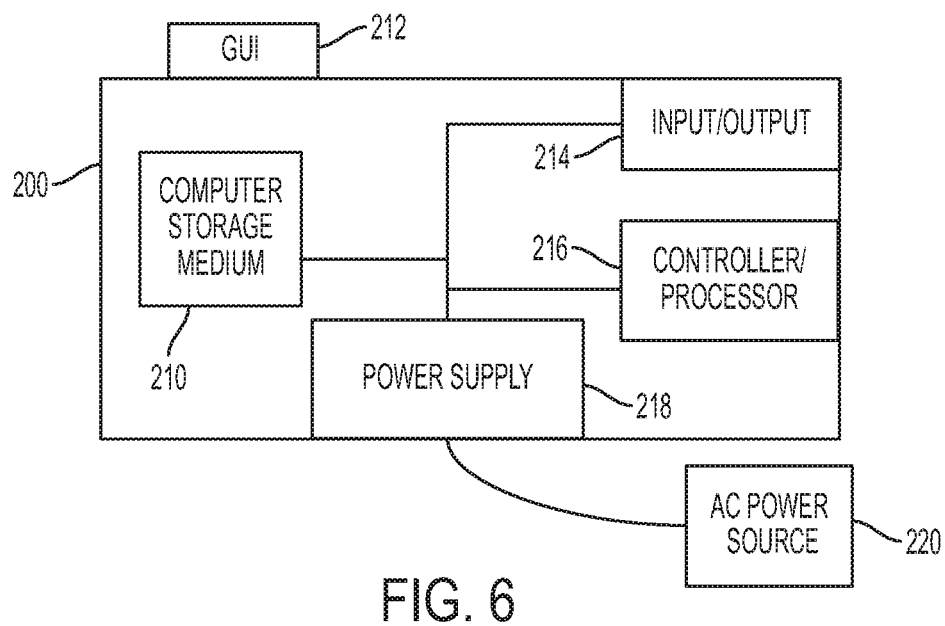
FIG. 6 is a schematic diagram illustrating devices herein.

FIG. 6 illustrates a computerized device 200, which can be used with systems and methods herein and can act as a DFE, and can comprise, for example, a print server, a personal computer, a portable computing device, an element of a printing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 6, a body housing has one or more functional components that operate on power supplied from an alternating current (AC) source 220 by the power supply 218. The power supply 218 can comprise a common power conversion unit, power storage element (e.g., a battery, etc), etc.

Figure 7:
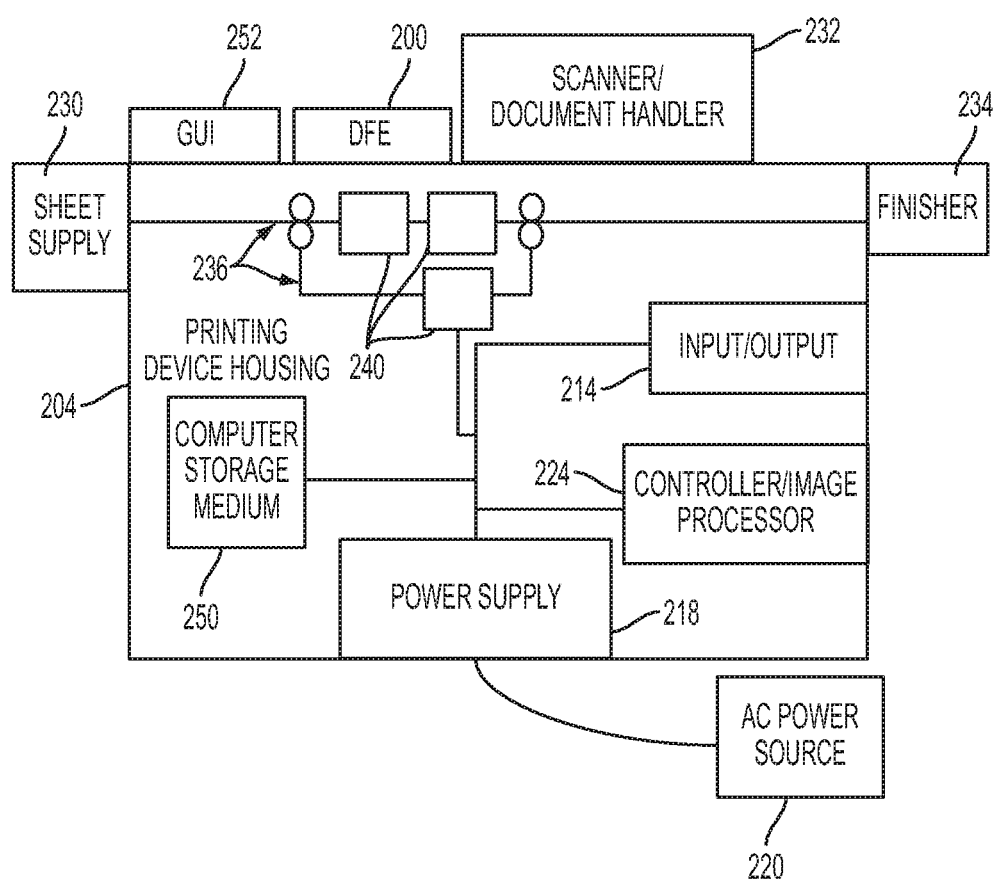
FIG. 7 is a schematic diagram illustrating devices herein.

FIG. 7 illustrates a computerized device that is a printing device 204, which can be used with systems and methods herein and can comprise, for example, a printer, copier, multi-function machine, multi-function device (MFD), etc. The printing device 204 includes many of the components mentioned above including a computer storage medium 250 that is similar to computer storage medium 210, a graphic user interface 252 that is similar to graphic user interface 212, and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

If the elements of the tone reproduction curve increase application of the marking material, a processor sums magnitudes of the elements of the tone reproduction curve, and determines if the summed magnitudes of the elements of the tone reproduction curve exceed the marking material limits, and at least one of the graphic user interfaces outputs a warning message if the summed magnitudes exceed the marking material limits. The printing elements 240 print the bitmap altered by the tone reproduction curve on print media.

As noted above, the marking material limits can be machine-dependent marking material limits or user-established marking material limits. If the machine-dependent marking material limit is greater than the user-established marking material limit, the magnitudes of the elements of the tone reproduction curve are summed in the following processing. For each of the elements of the tone reproduction curve, a maximum magnitude by which the curve increases application of the marking material is identified, and such maximum magnitudes are summed to produce a magnitude sum. The processing also determines if the summed magnitudes of the elements of the tone reproduction curve exceed the marking material limits by identifying the difference between the machine-dependent marking material limit and the user-established marking material limit to produce a limit difference, and determining if the magnitude sum exceeds the limit difference.

In another situation, if the machine-dependent marking material limit and the user-established marking material limit are equal, the following processing is performed. The processing sums the magnitudes of the elements of the tone reproduction curve by summing output values for each input value outside of the safe area of all of the elements of the tone reproduction curve to produce a summed output value for each input value outside of the safe area. The processing then determines if the summed magnitudes of the elements of the tone reproduction curve exceed the marking material limits by determining if the summed output value for each input value outside of the safe area exceeds the machine-dependent marking material limit.

The warning can be altered based on a policy to disallow or allow creation or import of over-limit tone reproduction curves, disallow or allow assignment of over-limit tone reproduction curves to specific jobs or queues, allow over-limit tone reproduction curve sheets to print, display a menu option to an operator regarding whether an over-limit sheet should print, and/or identify over-limit tone reproduction curve jobs as being faulty, etc. Also, the warning can be output at the time a user tone reproduction curve is created, at the time a user tone reproduction curve is assigned to a job, a queue, or an exception page, or at the time a job or sheet begins printing, etc.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand. A raster image processor (RIP) is a component used in a printing system that produces a raster image also known as a bitmap. The bitmap is then sent to a printing device for output. Raster image processing is the process that turns vector digital information into a high-resolution raster image. A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning refers to a process of representing a contone image as a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing apparatus comprising:
   one or more processors; and
   an interface electrically connected to said one or more processors; and
   said one or more processors determines if elements of a tone reproduction curve increase application of marking material,
   if said elements of said tone reproduction curve increase application of said marking material, said one or more processors sums magnitudes of said elements of said tone reproduction curve, and determines if summed magnitudes of said elements of said tone reproduction curve exceed marking material limits,
   said interface outputs a warning message if said summed magnitudes exceed said marking material limits, and
   said warning message being output at least one of:
   at a time a user tone reproduction curve is created;
   at a time a user tone reproduction curve is assigned to a job, a queue, or an exception page; and
   at a time a job or sheet begins printing.

2. The printing apparatus according to claim 1, said marking material limits comprise at least one of a machine-dependent marking material limit and a user-established marking material limit,
   if said machine-dependent marking material limit and said user-established marking material limit are equal:
   said one or more processors sums magnitudes of said elements of said tone reproduction curve by summing output values for each input value of said elements of said tone reproduction curve in the output increasing portion of the curve to produce a summed output value for each input value in the output increasing portion of the curve, and
   said one or more processors determines if said summed magnitudes of said elements of said tone reproduction curve exceed said marking material limits by determining if said summed output value for each input value in the output increasing portion of the curve exceeds said machine-dependent marking material limit.

3. The printing apparatus according to claim 1, said marking material limits comprise at least one of a machine-dependent marking material limit and a user-established marking material limit,
   if said machine-dependent marking material limit is greater than said user-established marking material limit, said one or more processors sums magnitudes of said elements of said tone reproduction curve by:
   for each of said elements of said tone reproduction curve, identifying maximum magnitudes by which said elements increase application of said marking material; and
   summing said maximum magnitudes to produce a magnitude sum, and
   said one or more processors determines if said summed magnitudes of said elements of said tone reproduction curve exceed said marking material limits by:
   identifying a difference between said machine-dependent marking material limit and said user-established marking material limit to produce a limit difference; and
   determining if said magnitude sum exceeds said limit difference.

4. The printing apparatus according to claim 1, said warning message being altered based on a policy to at least one of:
   disallow or allow creation or import of over-limit tone reproduction curves;
   disallow or allow assignment of over-limit tone reproduction curves to specific jobs or queues;
   allow over-limit tone reproduction curve sheets to print;
   display a menu option to an operator regarding whether an over-limit sheet should print; and
   identify over-limit tone reproduction curve jobs as being faulty.

5. A printing apparatus comprising:
   one or more processors;
   an interface electrically connected to said one or more processors; and
   printing elements electrically connected to said one or more processors,
   if elements of a tone reproduction curve increase application of marking material, said one or more processors sums magnitudes of said elements of said tone reproduction curve, and determines if summed magnitudes of said elements of said tone reproduction curve exceed marking material limits, said interface outputs a warning message if said summed magnitudes exceed said marking material limits, said warning message is output at least one of:
  at a time a user tone reproduction curve is created;
  at a time a user tone reproduction curve is assigned to a job, a queue, or an exception page; and
  at a time a job or sheet begins printing, and said printing elements print a print job altered by said tone reproduction curve on print media.

6. The printing apparatus according to claim 5, said marking material limits comprise at least one of a machine-dependent marking material limit and a user-established marking material limit, if said machine-dependent marking material limit and said user-established marking material limit are equal:
  said one or more processors sums magnitudes of said elements of said tone reproduction curve by summing output values for each input value of said elements of said tone reproduction curve in the output increasing portion of the curve to produce a summed output value for each input value in the output increasing portion of the curve, and
  said one or more processors determines if said summed magnitudes of said elements of said tone reproduction curve exceed said marking material limits by determining if said summed output value for each input value in the output increasing portion of the curve exceeds said machine-dependent marking material limit.

7. The printing apparatus according to claim 5, said marking material limits comprise at least one of a machine-dependent marking material limit and a user-established marking material limit, if said machine-dependent marking material limit is greater than said user-established marking material limit, said one or more processors sums magnitudes of said elements of said tone reproduction curve by:
  for each of said elements of said tone reproduction curve, identifying maximum magnitudes by which said elements increase application of said marking material; and
  summing said maximum magnitudes to produce a magnitude sum, and said one or more processors determines if said summed magnitudes of said elements of said tone reproduction curve exceed said marking material limits by:
  identifying a difference between said machine-dependent marking material limit and said user-established marking material limit to produce a limit difference; and
  determining if said magnitude sum exceeds said limit difference.

8. The printing apparatus according to claim 5, said warning message being altered based on a policy to at least one of:
  disallow or allow creation or import of over-limit tone reproduction curves;
  disallow or allow assignment of over-limit tone reproduction curves to specific jobs or queues;
  allow over-limit tone reproduction curve sheets to print;
  display a menu option to an operator regarding whether an over-limit sheet should print; and
  identify over-limit tone reproduction curve jobs as being faulty.

9. A method comprising:

receiving, into an interface, creation or assignment of a tone reproduction curve used for printing by a printing apparatus having printing elements electrically connected to one or more processors, said one or more processors are electrically connected to said interface;

automatically determining if elements of said tone reproduction curve increase application of marking material by said printing elements, using said one or more processors;

if said elements of said tone reproduction curve increase application of said marking material automatically:
  summing magnitudes of said elements of said tone reproduction curve using said one or more processors;
  determining if summed magnitudes of said elements of said tone reproduction curve exceed marking material limits using said one or more processors; and
  outputting, from said interface, a warning message if said summed magnitudes exceed said marking material limits, and said interface outputs said warning message at least one of:
  at a time a user tone reproduction curve is created;
  at a time a user tone reproduction curve is assigned to a job, a queue, or an exception page; and
  at a time a job or sheet begins printing.

10. The method according to claim 9, said marking material limits comprise at least one of a machine-dependent marking material limit and a user-established marking material limit, if said machine-dependent marking material limit and said user-established marking material limit are equal:
  said summing magnitudes of said elements of said tone reproduction curve comprises summing output values for each input value of said elements of said tone reproduction curve in the output increasing portion of the curve to produce a summed output value for each input value in the output increasing portion of the curve, and
  said determining if said summed magnitudes of said elements of said tone reproduction curve exceed said marking material limits comprises determining if said summed output value for each input value in the output increasing portion of the curve exceeds said machine-dependent marking material limit.

11. The method according to claim 9, said marking material limits comprise at least one of a machine-dependent marking material limit and a user-established marking material limit, if said machine-dependent marking material limit is greater than said user-established marking material limit, said summing magnitudes of said elements of said tone reproduction curve comprises:
  for each of said elements of said tone reproduction curve, identifying maximum magnitudes by which said elements increase application of said marking material; and
  summing said maximum magnitudes to produce a magnitude sum, and said determining if said summed magnitudes of said elements of said tone reproduction curve exceed said marking material limits comprises:
  identifying a difference between said machine-dependent marking material limit and said user-established marking material limit to produce a limit difference; and determining if said magnitude sum exceeds said limit difference.

12. The method according to claim 9, further comprising altering said warning message based on a policy to at least one of:
- disallow or allow creation or import of over-limit tone reproduction curves;
- disallow or allow assignment of over-limit tone reproduction curves to specific jobs or queues;
- allow over-limit tone reproduction curve sheets to print;
- display a menu option to an operator regarding whether an over-limit sheet should print; and
- identify over-limit tone reproduction curve jobs as being faulty.

13. A method comprising:
- receiving, into an interface, creation or assignment of a tone reproduction curve used for printing by a printing apparatus having printing elements electrically connected to one or more processors, said one or more processors are electrically connected to said interface;
- automatically determining if elements of said tone reproduction curve increase application of marking material by said printing elements using said one or more processors;
- if said elements of said tone reproduction curve increase application of said marking material automatically:
  - summing magnitudes of said elements of said tone reproduction curve using said one or more processors;
  - determining if summed magnitudes of said elements of said tone reproduction curve exceed marking material limits using said one or more processors; and
  - outputting, from said interface, a warning message if said summed magnitudes exceed said marking material limits; and
- printing a print job altered by said tone reproduction curve on print media using said printing elements of said printing apparatus,
- said interface outputs said warning message at least one of:
  - at a time a user tone reproduction curve is created;
  - at a time a user tone reproduction curve is assigned to a job, a queue, or an exception page; and
  - at a time a job or sheet begins printing.

14. The method according to claim 13, said marking material limits comprise at least one of a machine-dependent marking material limit and a user-established marking material limit,
- if said machine-dependent marking material limit and said user-established marking material limit are equal:
  - said summing magnitudes of said elements of said tone reproduction curve comprises summing output values for each input value of said elements of said tone reproduction curve in the output increasing portion of the curve to produce a summed output value for each input value in the output increasing portion of the curve, and
  - said determining if said summed magnitudes of said elements of said tone reproduction curve exceed said marking material limits comprises determining if said summed output value for each input value in the output increasing portion of the curve exceeds said machine-dependent marking material limit.

15. The method according to claim 13, said marking material limits comprise at least one of a machine-dependent marking material limit and a user-established marking material limit,
- if said machine-dependent marking material limit is greater than said user-established marking material limit, said summing magnitudes of said elements of said tone reproduction curve comprises:
  - for each of said elements of said tone reproduction curve, identifying maximum magnitudes by which said elements increase application of said marking material; and
  - summing said maximum magnitudes to produce a magnitude sum, and
- said determining if said summed magnitudes of said elements of said tone reproduction curve exceed said marking material limits comprises:
  - identifying a difference between said machine-dependent marking material limit and said user-established marking material limit to produce a limit difference; and
  - determining if said magnitude sum exceeds said limit difference.

16. The method according to claim 13, further comprising altering said warning message based on a policy to at least one of:
- disallow or allow creation or import of over-limit tone reproduction curves;
- disallow or allow assignment of over-limit tone reproduction curves to specific jobs or queues;
- allow over-limit tone reproduction curve sheets to print;
- display a menu option to an operator regarding whether an over-limit sheet should print; and
- identify over-limit tone reproduction curve jobs as being faulty.

* * * * *